(12) United States Patent
Chapin et al.

(10) Patent No.: US 6,560,071 B2
(45) Date of Patent: May 6, 2003

(54) DISC HEAD SLIDER HAVING CONVERGENT CHANNEL FEATURES WITH LEADING EDGE INLET

(75) Inventors: Mark A. Chapin, Louisville, CO (US); Michael D. Mundt, Longmont, CO (US); Anthony P. Sannino, Longmont, CO (US); Deborah S. Schnur, Minneapolis, MN (US); Scott E. Ryun, Prior Lake, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/962,299

(22) Filed: Sep. 25, 2001

(65) Prior Publication Data

US 2002/0109941 A1 Aug. 15, 2002

Related U.S. Application Data

(60) Provisional application No. 60/247,665, filed on Nov. 9, 2000, and provisional application No. 60/243,249, filed on Oct. 25, 2000.

(51) Int. Cl.[7] ............................................. G11B 17/32
(52) U.S. Cl. ............................. 360/235.7; 360/236.1; 360/236.2
(58) Field of Search ........................ 360/235.1–235.9, 360/236.1–236.9

(56) References Cited

U.S. PATENT DOCUMENTS

| | | | |
|---|---|---|---|
| 3,855,625 A | * 12/1974 | Garnier et al. | |
| 4,218,715 A | 8/1980 | Garnier | |
| 4,475,135 A | 10/1984 | Warner et al. | |
| 4,644,641 A | 2/1987 | Verdone | 29/603 |
| 4,984,114 A | 1/1991 | Takeuchi et al. | |
| 5,062,017 A | 10/1991 | Strom et al. | |
| 5,343,343 A | 8/1994 | Chapin | |
| 5,396,386 A | 3/1995 | Bolasna et al. | |
| 5,624,581 A | 4/1997 | Ihrke et al. | |
| 5,798,889 A | 8/1998 | Dorius et al. | |
| 5,940,249 A | 8/1999 | Hendriks | |
| 6,144,528 A | * 11/2000 | Anaya-Dufresne et al. | 360/235.4 |
| 6,172,851 B1 | * 1/2001 | Utsunomiya | 360/236.3 |
| 6,188,547 B1 | 2/2001 | Gui et al. | 360/236.5 |
| 6,275,467 B1 | * 8/2001 | Wang et al. | 360/236.5 |
| 6,311,388 B1 | * 11/2001 | Berg et al. | 360/235.4 |
| 6,333,835 B1 | * 12/2001 | Kang et al. | 360/235.4 |
| 6,462,909 B1 | * 10/2002 | Boutaghou et al. | 360/235.8 |

FOREIGN PATENT DOCUMENTS

EP    0 747 890    12/1996

OTHER PUBLICATIONS

Yong Hu, Jones PM, Chang PT, Bogy DB, "Partial contact air bearing characteristics of tripad sliders for proximity recording," ASME, Transactions of the Asme, Journal of Tribology, vol. 120, No. 2, Apr. 1998, pp. 272–279.

David Bogy and Qing–Hua Zeng, "Reliability Criteria for Dynamic Load/Unload", CML Research Report, 1999, pp. 1–19.

* cited by examiner

*Primary Examiner*—Allen Cao
(74) *Attorney, Agent, or Firm*—Westman, Champlin & Kelly

(57) ABSTRACT

A disc head slider includes a slider body having a disc-opposing face with leading and trailing slider edges, a slider length measured between the leading and trailing slider edges, a bearing surface, a recessed area, an inlet and a convergent channel. The recessed area is recessed from the bearing surface. The inlet has a leading channel end, which is open to air flow from the leading slider edge, channel side walls and a trailing channel end. The convergent channel has a leading channel end, which is open to fluid flow from the inlet, channel side walls and a trailing channel end, which is closed to the fluid flow. The trailing channel end of the convergent channel is located along the slider length rearward of at least a portion of the recessed area and forward of at least a portion of the bearing surface.

22 Claims, 8 Drawing Sheets

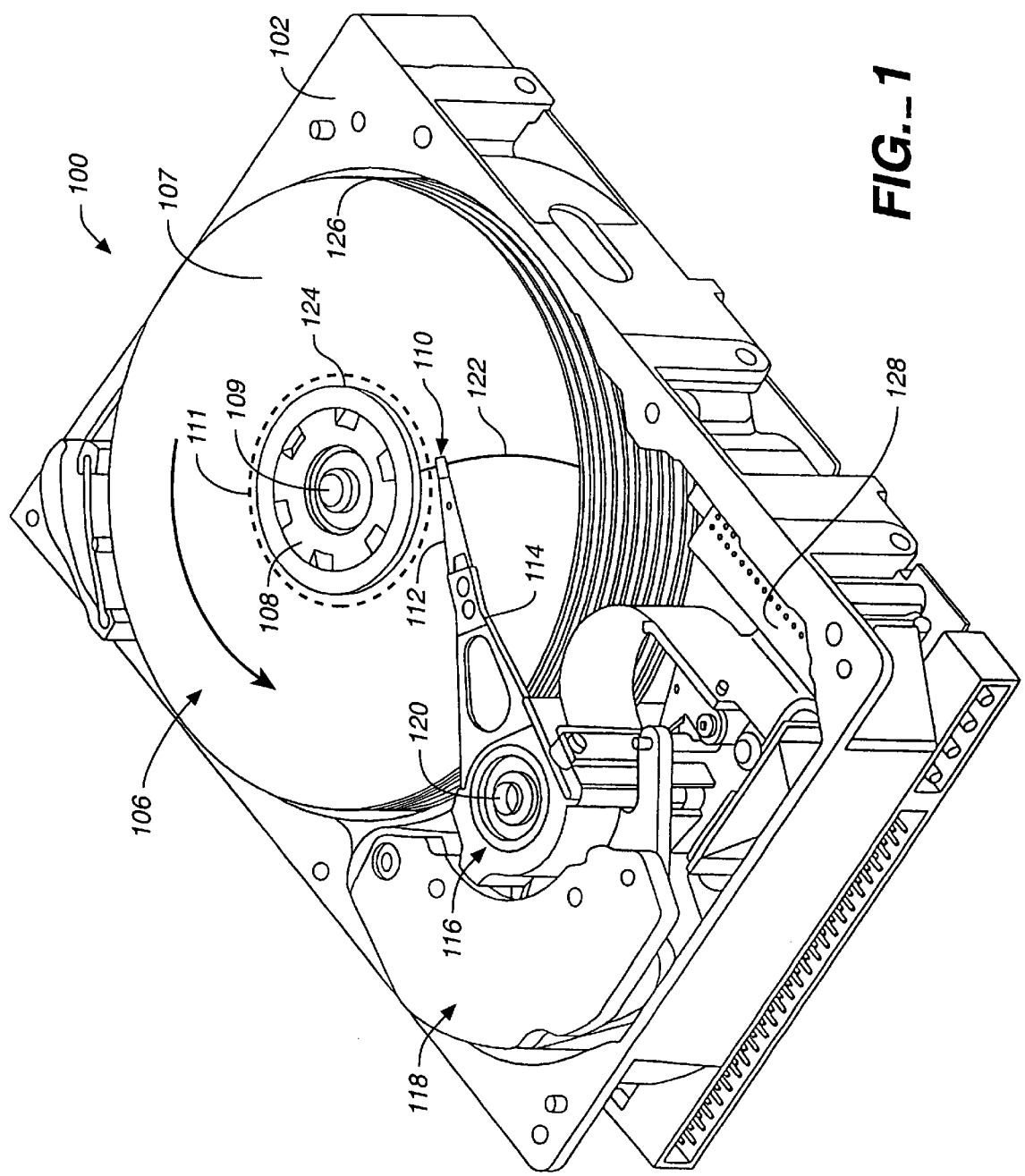
FIG._1

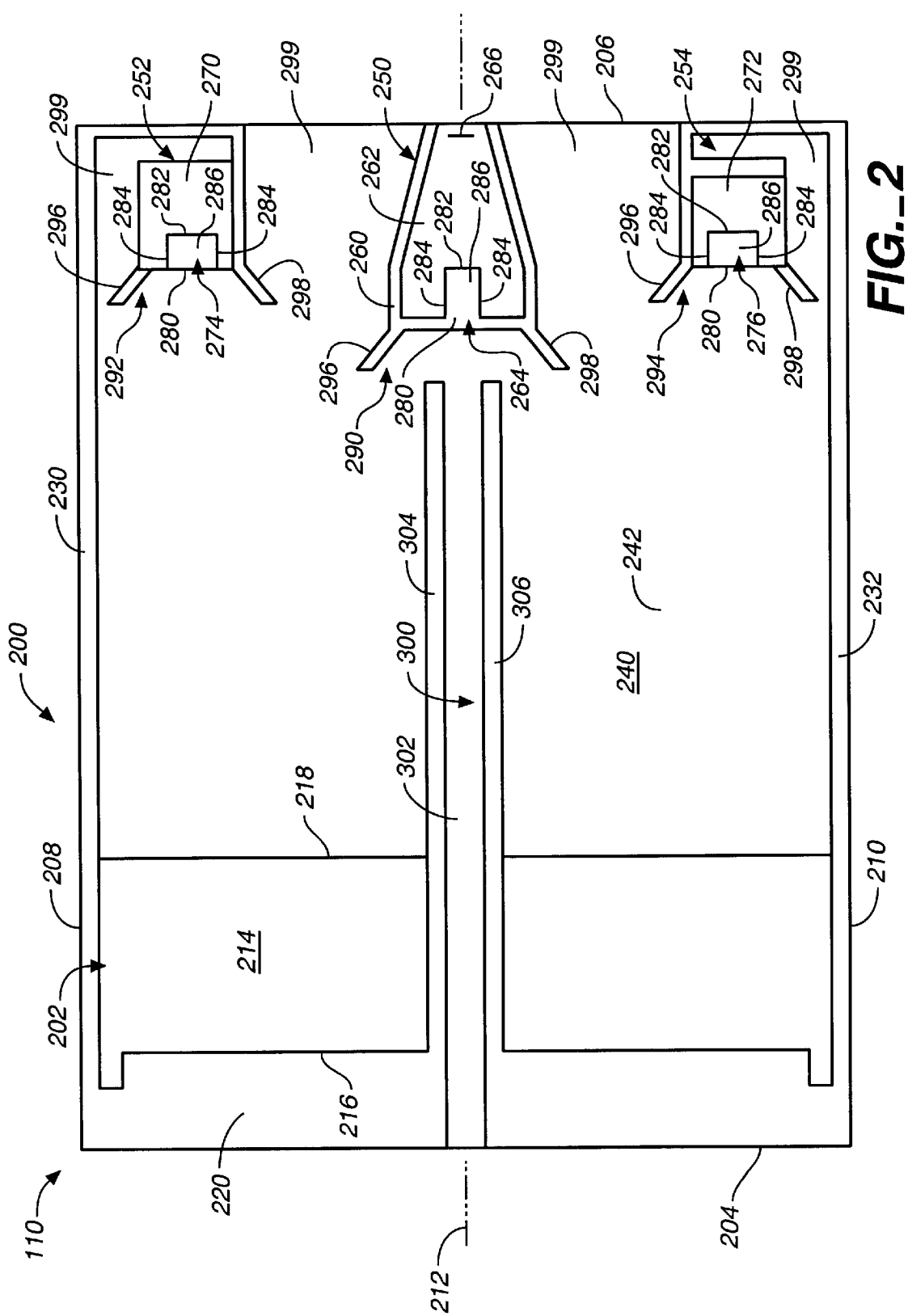
FIG._2

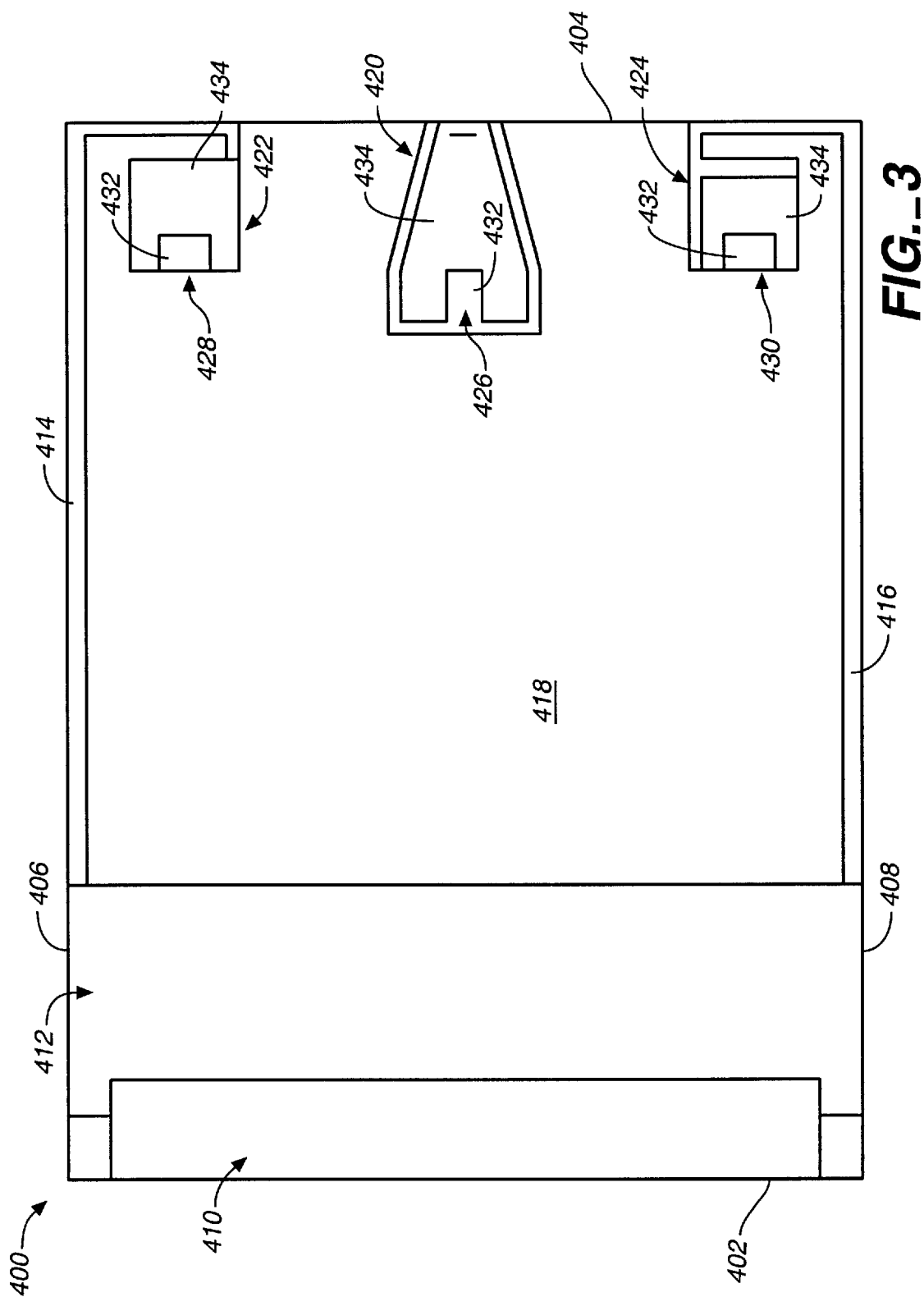
FIG._3

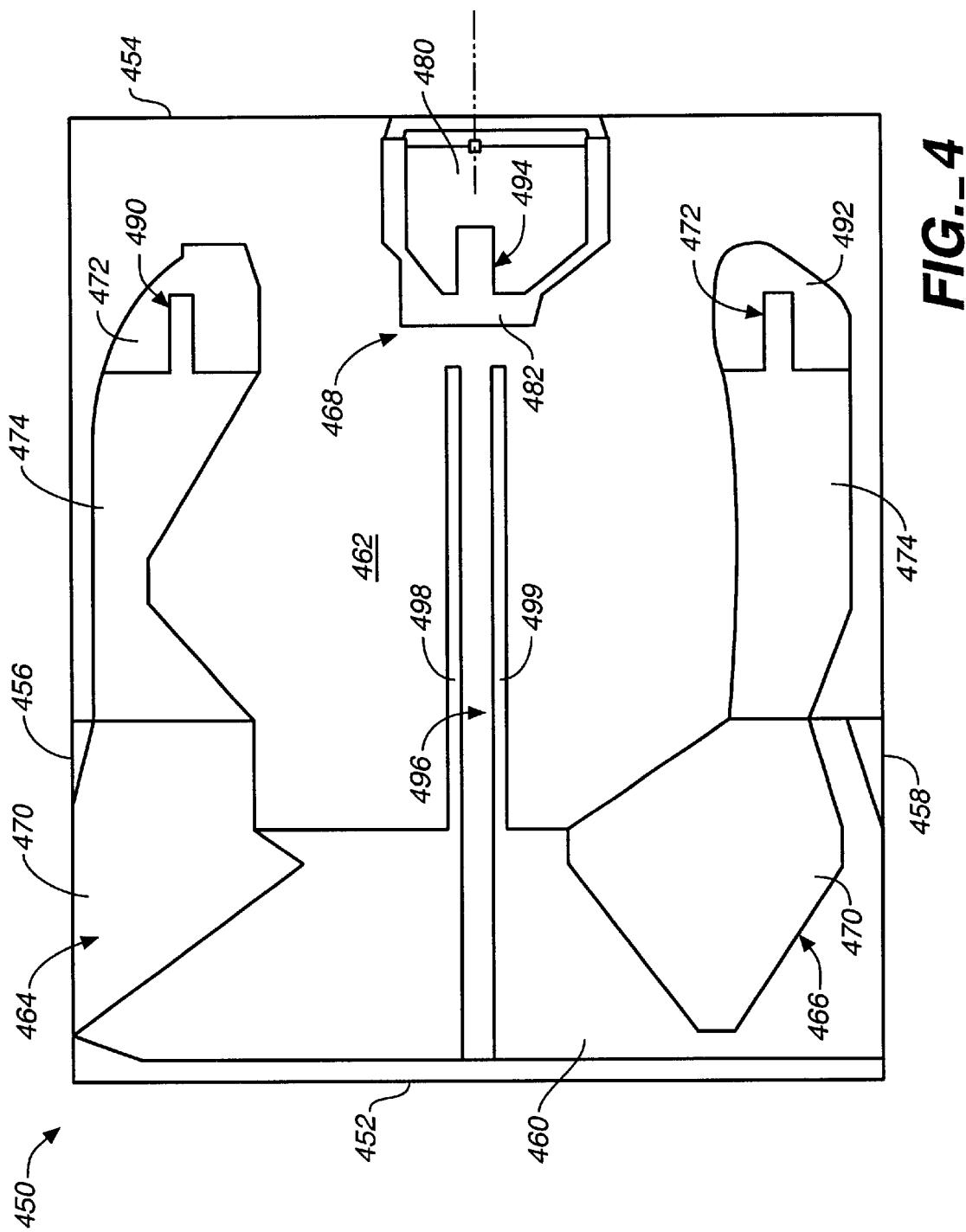
FIG._4

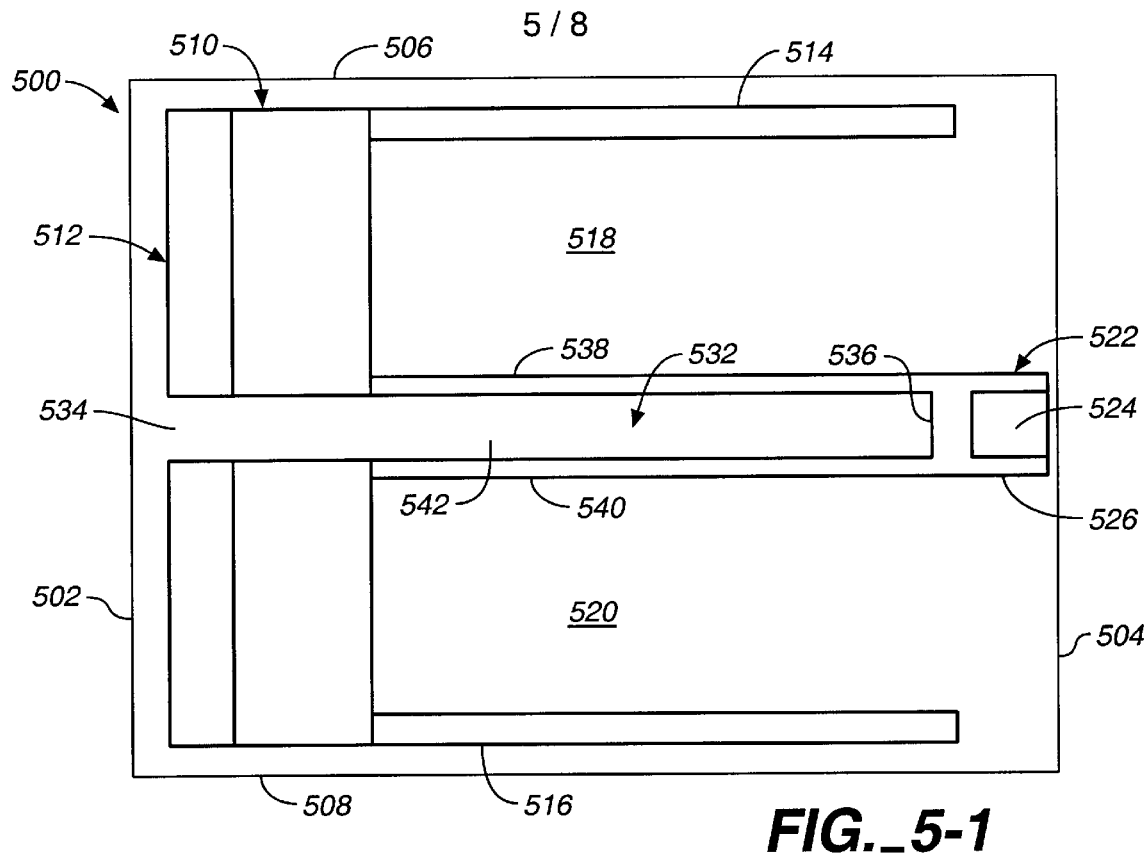
FIG._5-1
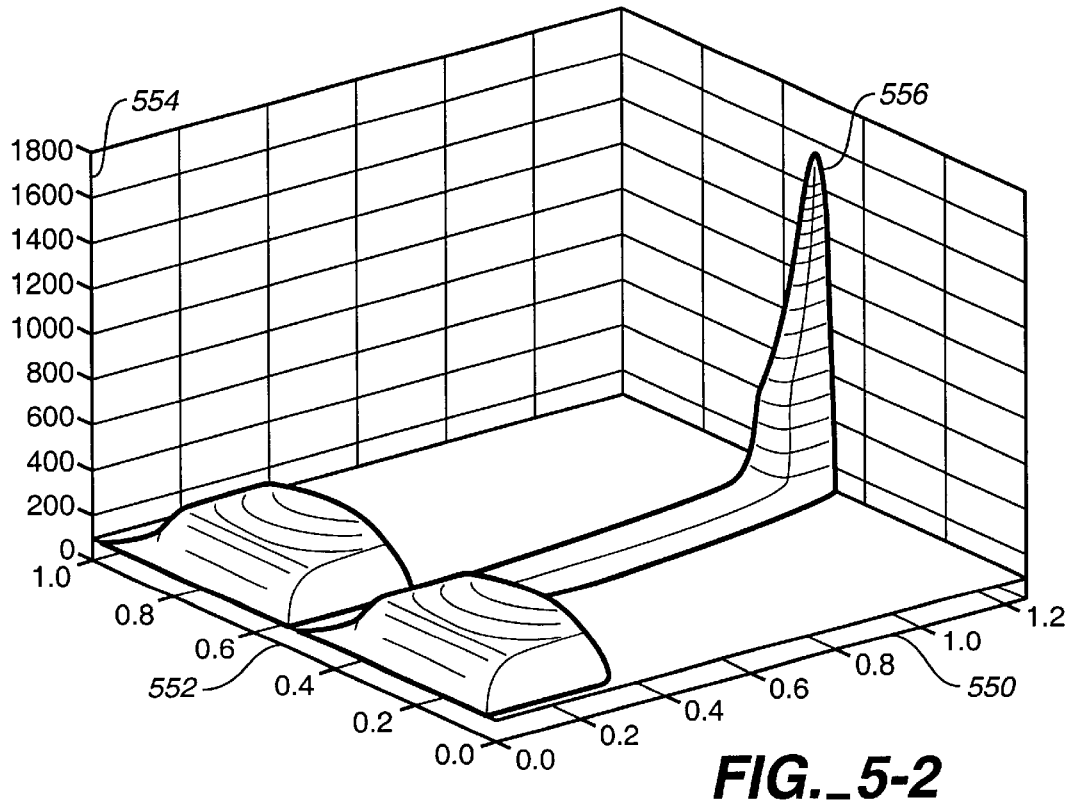
FIG._5-2

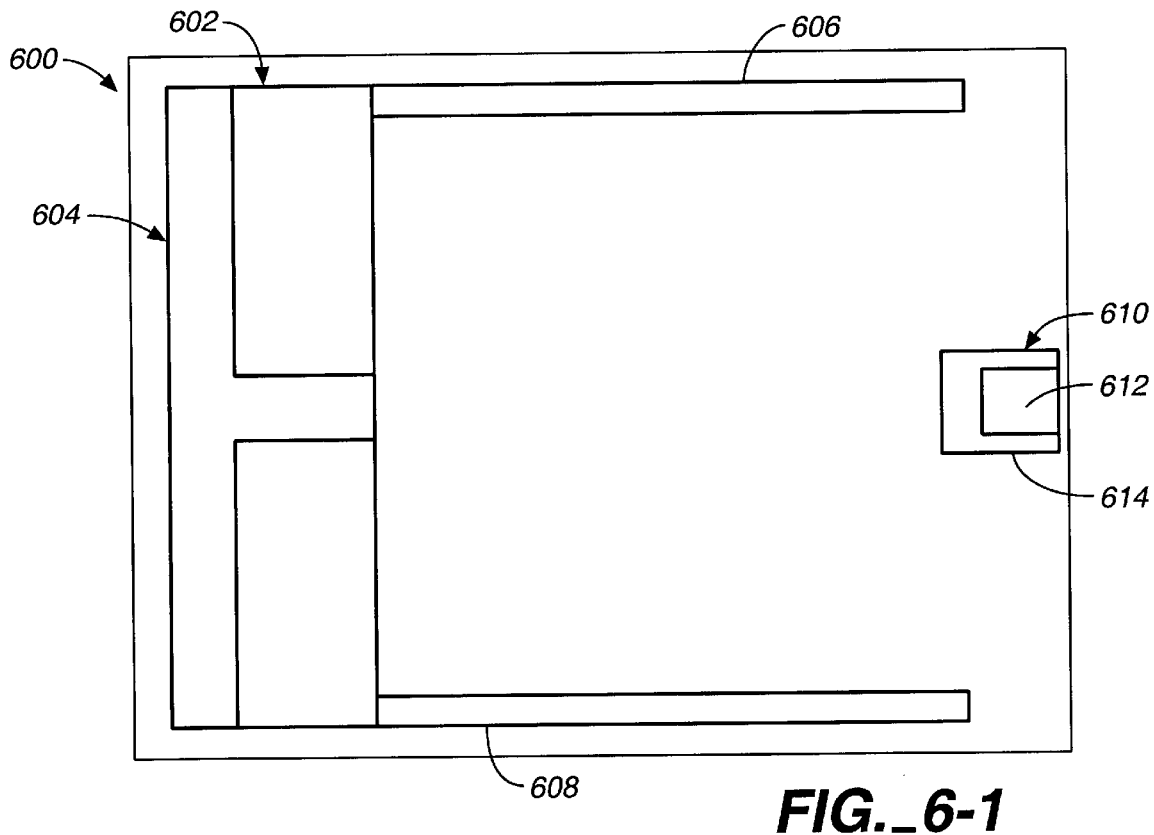
FIG._6-1
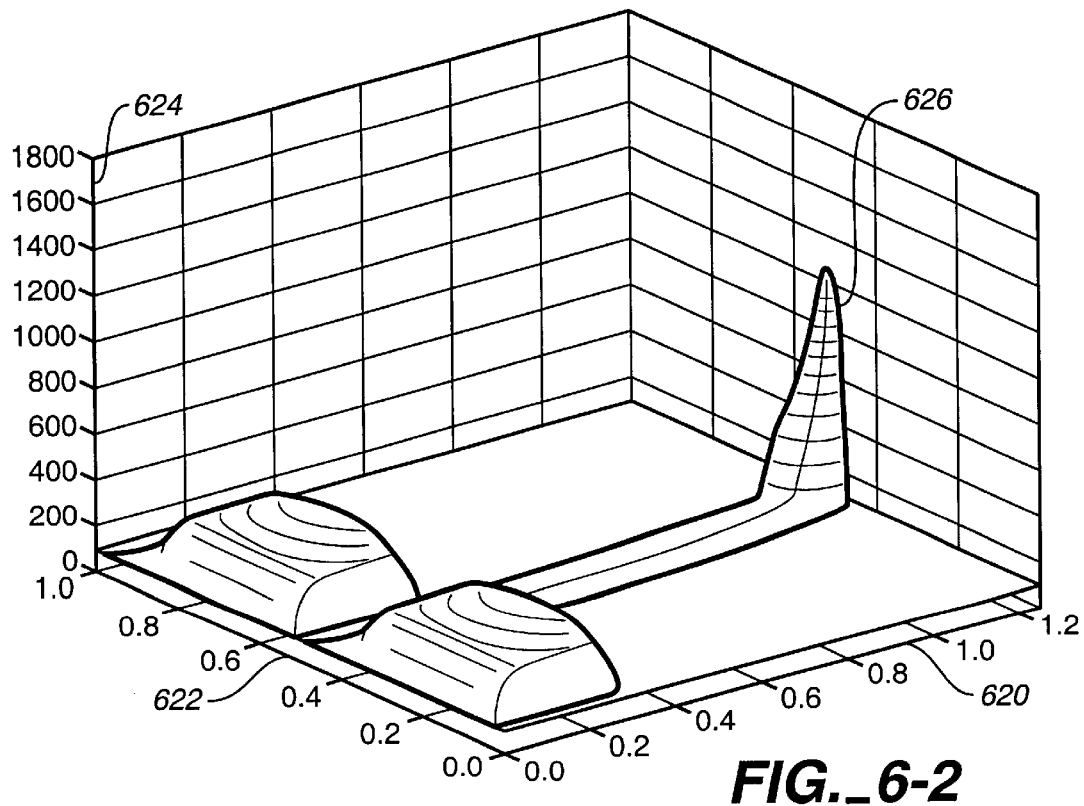
FIG._6-2

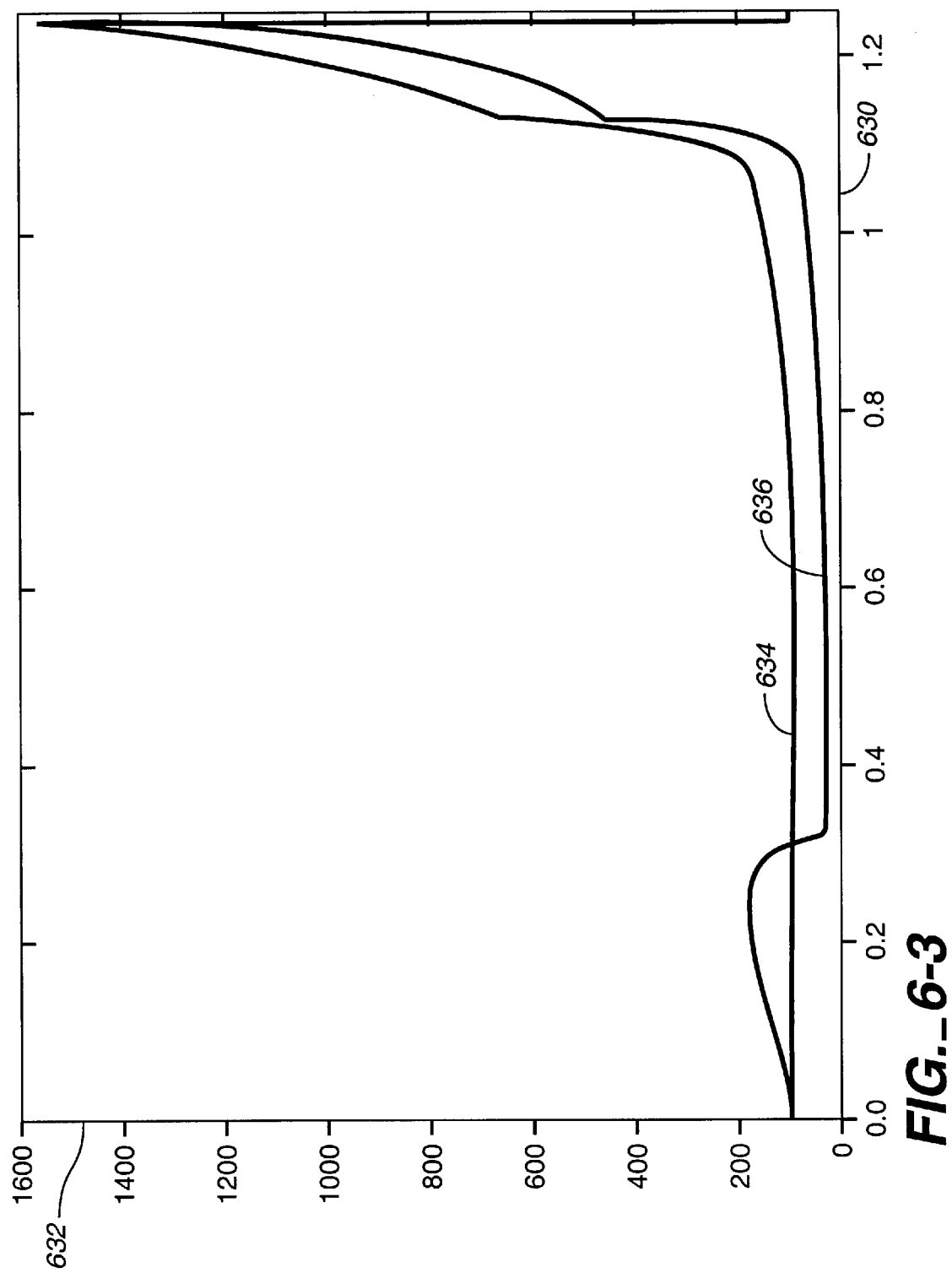
FIG._6-3

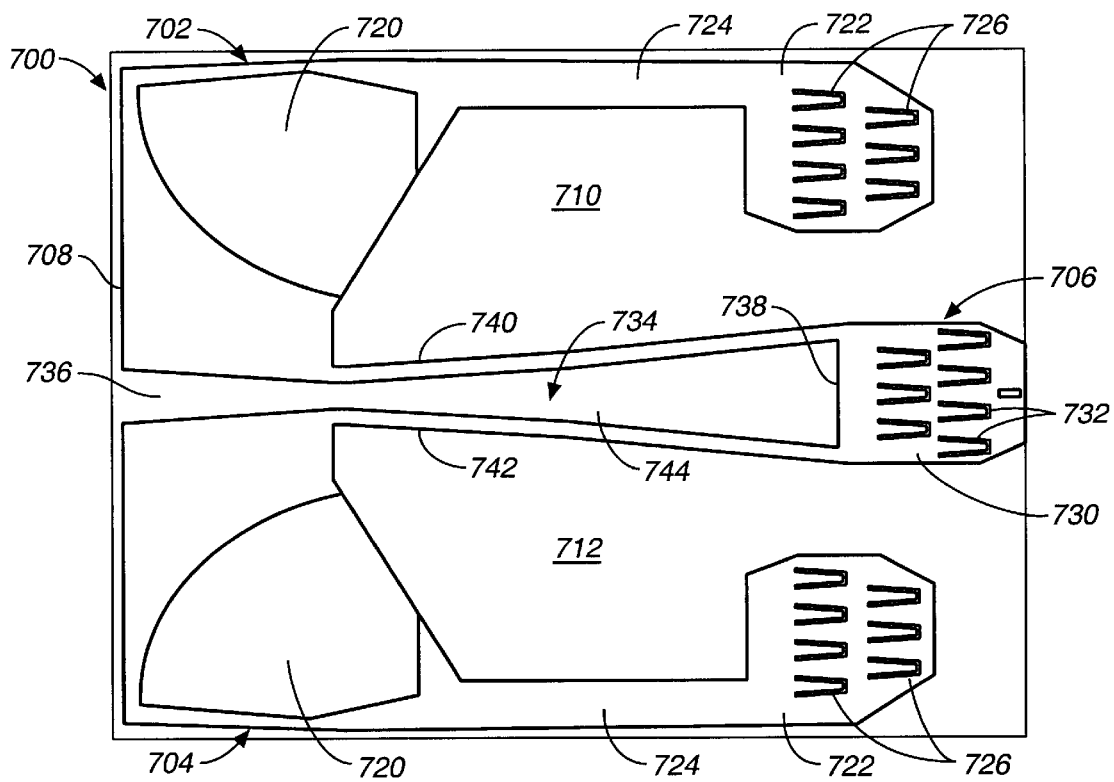
FIG._7
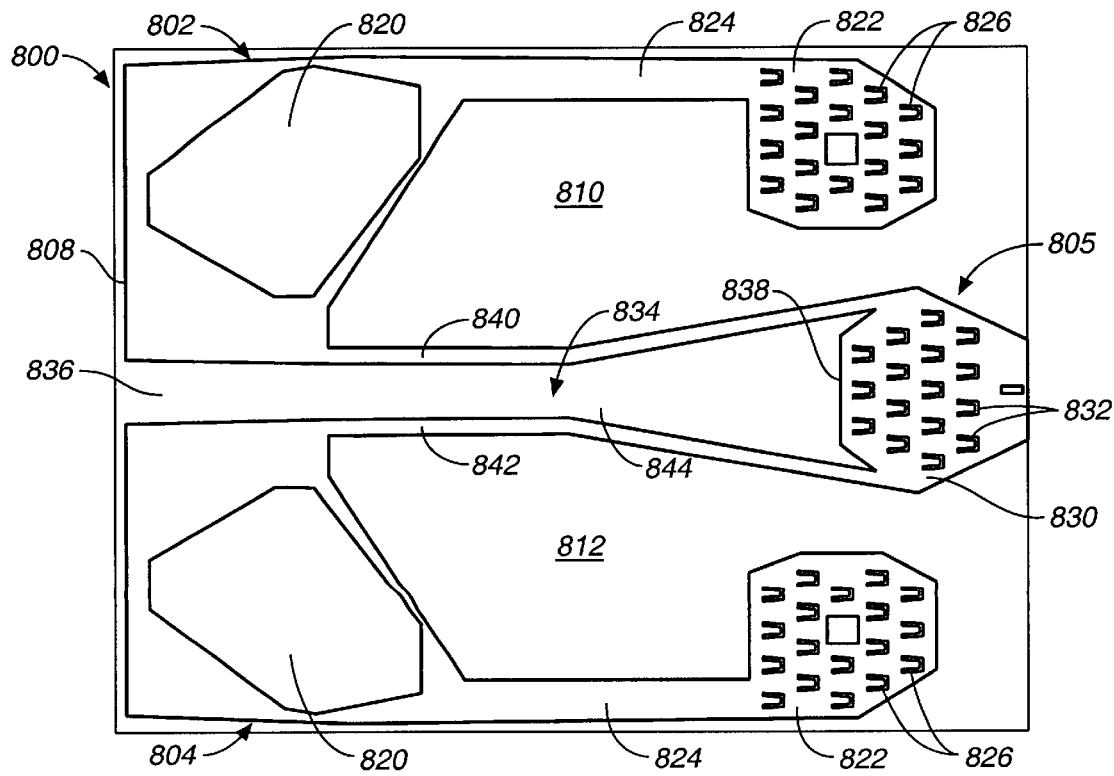
FIG._8

DISC HEAD SLIDER HAVING CONVERGENT CHANNEL FEATURES WITH LEADING EDGE INLET

CROSS-REFERENCE TO RELATED APPLICATIONS

This application claims the benefit of U.S. Provisional Application Serial No. 60/247,665, entitled "TURBO FUNNEL TRENCH AAB FOR INCREASED CONTACT STIFFNESS AND ENHANCED TAKE-OFF PERFORMANCE," filed Nov. 9, 2000, and U.S. Provisional Application Serial No. 60/243,249, entitled "AIR BEARING TRENCH DESIGN HAVING A LEADING EDGE INLET CHANNEL FOR INCREASE TRAILING EDGE PRESSURIZATION," filed Oct. 25, 2000.

Cross reference is also made to U.S. application Ser. No. 09/931,143 entitled "FUNNELED TRENCH AAB FOR INCREASED CONTACT STIFFNESS AND ENHANCED TAKE-OFF PERFORMANCE, filed Aug. 16, 2001.

FIELD OF THE INVENTION

The present invention relates to data storage systems and, more particularly, to a disc head slider for communicating with a recording medium.

BACKGROUND OF THE INVENTION

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a first peak near the taper end or "leading edge" due to a high compression angle of the taper or step, and a second peak near the recording end or "trailing edge" due to a low bearing clearance for efficient magnetic recording. This dual-peak pressure distribution results in a bearing with a relatively high pitch stiffness.

The bearing clearance between the slider and the disc surface at the recording head is an important parameter to disc drive performance. As average flying heights continue to be reduced, it is important to control several metrics of flying height performance, such as flying height sensitivity to process variations, take-off performance and vibration damping capability.

Fly height loss due to manufacturing process variations has been observed to be an increasing source of intermittent head/media contact, as flying heights continue to be reduced, especially at sub half-microinch flying heights. Intermittent contact induces vibrations that are detrimental to reading and writing quality at such low flying heights. In addition, the ability of the air bearing to dampen vibrations and provide good take-off performance has been shown to be a critical factor in enabling sub half-microinch flying heights.

Slider air bearings possess three degrees of freedom, vertical motion, pitch rotation and roll rotation. These three degrees of freedom are associated with three applied forces, which include the preload force imposed by the load beam and the suction and lift forces developed by the air bearing. A steady-state flying attitude is achieved when these three forces balance each other.

At the steady-state flying attitude, the fluid bearing possesses intrinsic stiffnesses with respect to its three degrees of freedom. These stiffnesses are referred to as vertical, pitch and roll stiffness. In addition, contact stiffness is defined as a vectorial combination of the slider pitch stiffness and the slider vertical stiffness. Contact stiffness characterizes the vertical stiffness of the slider at the particular location of the pole tip. Contact stiffness, Kc, is defined as:

$$Kc = \frac{Kp}{\frac{Kp}{Kz} + b^2} \quad \text{EQ. 1}$$

where "Kp" is the pitch stiffness, "Kz" is the vertical stiffness and "b" is the distance between the slider pivot point and the pole tip.

Manufacturing variations can cause variations in the pitch static angle (PSA) or the preload force, which impose variations in the slider flying attitude. However, increasing the pitch stiffness and vertical stiffness of the air bearing results in a larger resistance to variations in the slider's flying attitude. An increase in pitch and vertical stiffness can be achieved by generating more suction and lift force per unit area of the air bearing.

In general, contact stiffness (or "local pole tip stiffness") is related to the amount of lift and suction force located at the vicinity of the pole tip, which is typically near the trailing edge of the slider. Therefore, moving the center of suction within the cavity closer to the pole tip can result in higher contact stiffness. The center of suction can be moved toward the trailing edge by reducing the depth of the cavity, increasing the depth of the "step" surfaces, or lowering the cavity/step depth ratio to produce a suction force that is more spread within the cavity. Increasing the cavity/step ratio has the tendency to create the center of suction closer to the cavity dam.

Also, at a given pitch angle, an increase in linear velocity will tend to spread the suction force within the cavity, thus moving the center of suction towards the trailing edge. This suggests interaction of two parameters on the location of the center of suction: (1) linear velocity; and (2) cavity/step depth ratio. Designing an air bearing for higher suction towards the pole tip can therefore include selecting the correct cavity/step depth ratio at a given linear velocity, which is dictated by the spindle speed and radius configuration of the disc drive. However, moving the center of suction towards the pole tip has been shown to compromise take-off performance, which degrades contact start-stop performance.

Another concept that has been proposed for increasing suction force near the pole tip is a "suction at trailing edge air bearing", which can be achieved by moving the location of the cavity toward the trailing edge. However, this design does not fully utilize the large surface area on the slider located near the leading edge. This results in a loss of real estate that could have been utilized to increase suction and lift forces, which is known to increase air bearing stiffness and further decrease sensitivity to manufacturing process variations.

Improved slider bearings are therefore desired which minimize sensitivity of the slider to manufacturing variations by increasing contact stiffness while also enhancing take-off performance and improving damping capability of the slider.

SUMMARY OF THE INVENTION

One embodiment of the present invention is directed to a disc head slider which includes a slider body having a disc-opposing face with leading and trailing slider edges, a slider length measured between the leading and trailing slider edges, a bearing surface, a recessed area, an inlet and a convergent channel. The recessed area is recessed from the bearing surface. The inlet has a leading channel end, which is open to air flow from the leading slider edge, channel side walls and a trailing channel end. The convergent channel has a leading channel end, which is open to fluid flow from the inlet, channel side walls and a trailing channel end, which is closed to the fluid flow. The trailing channel end of the convergent channel is located along the slider length rearward of at least a portion of the recessed area and forward of at least a portion of the bearing surface.

Another embodiment of the present invention is directed to a disc head slider which includes a disc-opposing face having a bearing surface. A convergent channel is recessed within the disc-opposing face for receiving substantially ambient air flow from a leading edge of the disc-opposing face and generating a positive pressure gradient along the bearing surface, near a trailing edge of the disc-opposing face.

Yet another embodiment of the present invention is directed to a disc drive assembly which includes a disc rotatable about a central axis and a slider supported over the disc. The slider includes a slider body having a disc-opposing face with leading and trailing slider edges, a slider length measured between the leading and trailing slider edges, a bearing surface, a recessed area, an inlet and a convergent channel. The recessed area is recessed from the bearing surface. The inlet has a leading channel end, which is open to air flow from the leading slider edge, channel side walls and a trailing channel end. The convergent channel has a leading channel end, which is open to fluid flow from the inlet, channel side walls and a trailing channel end, which is closed to the fluid flow. The trailing channel end of the convergent channel is located along the slider length rearward of at least a portion of the recessed area and forward of at least a portion of the bearing surface.

BRIEF DESCRIPTION OF THE DRAWINGS

FIG. 1 is a perspective view of a disc drive in which the present invention is useful.

FIG. 2 is a bottom plan view of a slider having a leading edge inlet channel which feeds air flow to a convergent channel within the disc drive of FIG. 1, as viewed from the surface of a disc, according to one embodiment of the present invention.

FIG. 3 is a bottom plan view of a slider having no leading edge inlet channel.

FIG. 4 is a bottom plan view of a slider having a leading edge inlet channel feeding air flow to a convergent channel according to an alternative embodiment of the present invention.

FIG. 5-1 is a bottom plan view of a slider having a combined leading edge inlet and convergent channel according to an alternative embodiment of the present invention.

FIG. 5-2 is a graph illustrating a simulated pressure profile across the slider shown in FIG. 5-1.

FIG. 6-1 is a bottom plan view of a slider similar to the slider shown in FIG. 5-1 but with no leading edge inlet and convergent channel.

FIG. 6-2 is a graph illustrating a simulated pressure profile across the slider shown in FIG. 6-1.

FIG. 6-3 is a graph illustrating the simulated pressure profiles along the lateral center lines of the sliders shown in FIGS. 5-1 and 6-1.

FIG. 7 is a bottom plan view of a slider having a combined leading edge inlet and convergent channel according to another alternative embodiment of the present invention.

FIG. 8 is a bottom plan view of a slider having a combined leading edge inlet and convergent channel according to yet another alternative embodiment of the present invention.

DETAILED DESCRIPTION OF ILLUSTRATIVE EMBODIMENTS

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, slider 110 has a hydrodynamic (e.g., air) bearing that provides increased contact stiffness, enhanced take-off performance and increased vibration damping capability. The increased contact stiffness reduces the flying attitude sensitivity of slider 110 to manufacturing tolerances. Enhanced take-off performance is achieved by producing greater pressurization at low spindle speeds, and increased damping capability is achieved by increasing pressurization efficiency and increasing pressure gradients developed near the slider's trailing edge where the read and write transducer is located.

FIG. 2 is a bottom plan view of one of the sliders 110 of FIG. 1, as viewed from the surface of disc 107 according to one embodiment of the present invention. Slider 110 has a disc-opposing face 200, which defines a hydrodynamic (e.g., air) bearing surface 202. Bearing surface 202 is a reference level for disc opposing face 200 from which other surface levels are recessed (or raised). Disc-opposing face 200 includes a leading slider edge 204, a trailing slider edge 206, slider side edges 208 and 210, and a lateral center line 212. A cavity dam 214 extends between side edges 208 and 210, generally along leading slider edge 204. In one embodiment, the upper surface of cavity dam 214 is generally coplanar with and defines a portion of bearing surface 202. Cavity dam 214 has a leading edge 216 and a trailing edge 218.

A "stepped" leading taper 220 is formed along the leading edge 216 of cavity dam 214. "Stepped" leading taper 220 is recessed from bearing surface 202 by a substantially constant step depth in the range of about 0.1 microns to about 0.3 microns, for example, in order to provide pressurization for the bearing surface. Other step depths can also be used. In an alternative embodiment, leading taper 220 has a depth relative to bearing surface 202 that gradually decreases from leading slider edge 204 to the leading edge 216 of cavity dam 214. Leading taper 220 can be formed by any method, such as ion milling, reactive ion etching (RIB) or lapping. In one embodiment, leading taper 220 is formed by ion milling through a gray scale photolithography mask that allows multiple depths to be etched with a single mask. Leading taper 220 serves to pressurize air as the air is dragged under slider 110 by the disc surface. An additional effect of leading taper 216 is to create a first peak near leading edge 204 in the pressure distribution under slider 110.

A first border wall 230 is positioned along slider side edge 208, and a second border wall 232 is positioned along slider side edge 210. Border walls 230 and 232 extend from cavity dam 214 to trailing slider edge 206. In one embodiment, border walls 230 an 232 have upper surfaces that are recessed from bearing surface 202 by the step depth of approximately 0.1 microns to approximately 0.3 microns and have a width of approximately 10 microns to approximately 100 microns. Other dimensions can also be used.

A subambient pressure cavity 240 is defined between cavity dam 214 and border walls 230 and 232. Subambient pressure cavity 240 is a recessed area having a cavity floor 242 which is recessed from bearing surface 202 by a cavity depth, which is greater than the step depth. In one embodiment, cavity depth 242 is in the range of about 1 micron to about 3 microns. Other cavity depths can also be used.

Subambient pressure cavity 240 trails cavity dam 214 relative to a direction of air flow from leading slider edge 204 toward trailing slider edge 206. Border walls 230 and 232 are very narrow so as to maximize the area of subambient pressure cavity 240 and thus the amount of suction force developed within the cavity while still serving to define the cavity and isolate the cavity from ambient pressure along slider side edges 208 and 210. Border walls 230 and 232 are recessed slightly relative to bearing surface 202 in order to allow for pressurization of bearing surface 202 when the air flow generated by the rotating disc is at skew with respect to lateral center line 212. However, the upper surfaces of border walls 230 and 232 can be located in the same plane as bearing surface 202 in alternative embodiments.

Slider 110 further includes an isolated center bearing pad 250 and side bearing pads 252 and 254, which are positioned along trailing slider edge 206. Center pad 250 is positioned along lateral center line 212, and side pads 252 and 254 are positioned near slider side edges 208 and 210, respectively. In alternative embodiments, center pad 250 can be skewed or offset with respect to line 212. Border walls 230 and 232 wrap around bearing pads 252 and 254 to further increase the size of cavity 240.

Center pad 250 has leading and side step surfaces 260, a bearing surface 262 and a convergent channel feature (or "trench") 264. Bearing surface 262 is generally coplanar with the upper surface of cavity dam 214 and forms a part of bearing surface 202. Leading and side step surfaces 260 are generally parallel to and recessed from bearing surface 262 by the step depth of 0.1 to 0.3 microns, for example, for providing pressurization of bearing surface 262 from air flow venting from cavity 240. Center pad 250 supports a read/write transducer 266 along trailing slider edge 206. In alternative embodiments, transducer 266 can be positioned at other locations on slider 110. However, when placed at or near trailing slider edge 206, transducer 266 is located near the closest point on slider 110 to the surface of disc 107 (shown in FIG. 1) when slider 110 flies with a positive pitch angle. With a positive pitch angle, trailing slider edge 206 is closer to the surface of disc 107 than leading slider edge 204.

Similarly, side pads 252 and 254 include bearing surfaces 270 and 272 and convergent channel features 274 and 276, respectively. Side pads 252 and 254 can also include leading and/or side step surfaces similar to center pad 250 in alternative embodiments. Bearing surfaces 270 and 272 are generally coplanar with the upper surface of cavity dam 214 and bearing surface 262 and also form a part of the overall bearing surface 202.

Channels 264, 274 and 276 each have a leading channel end (or "inlet") 280, a trailing channel end (or "outlet") 282, side walls 284 and a channel floor 286. Channels 264, 274 and 276 can also be formed through photolithography processes such as ion milling, chemical etching or reactive ion etching (RIE), for example. Alternatively, channels 264, 274 and 276 can be formed along with pads 250, 252 and 254 through an additive process such as material deposition.

In the embodiment shown in FIG. 2, channel floors are recessed from bearing surface 202 by the step depth and are generally parallel with the leading and side step surfaces of pads 250, 252 and 254. In an alternative embodiment, channel floors 286 are vertically contoured relative to bearing surfaces 262, 270 and 272. For example, channel floors 286 can be tapered or otherwise vertically profiled so that the channel floors have a depth relative to bearing surfaces 262, 270 and 272 that progressively decreases along all or part of the length of the channel from leading channel end 280 to trailing channel end 282. The vertical profile can be linear, rectilinear, curved, curvilinear or a combination of these profiles. Also, a plurality of stepped surfaces can be used to approximate a taper along channel floors 286. Other vertically tapered profiles can also be used.

Leading channel ends 280 are open to fluid flow from subambient pressure cavity 240, and trailing channel ends 282 are closed to the fluid flow. During operation, the leading walls to either side of each channel 264, 274 and 276 present themselves as a substantial pressure rise to the local fluid flow. Since the opening to each channel, at leading channel ends 280, does not have the same pressure rise, it is seen as a preferential path for the fluid flow to travel. Once the fluid flow enters channels 264, 274 and 276, the flow is essentially bounded by channel side walls 284 and trailing channel end 282 and is forced to rise over trailing channel end 282, forming a "convergent" channel for the flow. This creates localized pressure areas at discrete regions on bearing surfaces 262, 270 and 272, just rearward of trailing channel ends 282. In one embodiment, these discrete regions have surface areas rearward of trailing channels ends 282 that are at least as long as the width of the channels, as measured between side walls 284. This provides sufficient surface area on which the localized pressure gradients can act. These channels can be symmetrical about lateral center line 212, as shown in FIG. 2, or can be asymmetrical to provide preferential pressurization at certain slider skew angles. Channel side walls 284 can be parallel to one another or non-parallel to one another.

The localized positive pressure gradients developed along bearing surfaces 262, 270 and 272 assist in providing pitch and roll stiffness to slider 110 and provide an energy dissipation mechanism during slider vibration, which dampens leading edge pitch and roll mode type vibrations at the slider's natural resonance frequencies. Leading edge pitch refers to rotation about a line near the leading edge of the slider, whereas trailing edge pitch refers to rotation about a line near the trailing edge of the slider. Roll mode type vibrations refer to rotation about the slider's lateral center line 212.

The amount of damping is proportional to the magnitude of the gradients that exist in the pressure field between slider 110 and the disc surface. The size and intensity of the localized positive pressure gradients depend on the channel length to width ratio, the absolute sizes of the channels, the depth and shape of the channel floors, and the height of the column of air between the channel floor and the disc surface. In one embodiment, the ratio of the channel lengths to the channel widths range from 0.5 to 5.0, but may vary outside that range depending on the design purposes of the channel feature. In another embodiment, the length to width ratio ranges from 2.0 to 2.5.

In the embodiment shown in FIG. 2, the efficiency of channels 264, 274 and 276 is increased with the addition of funnels 290, 292 and 294 and a leading edge inlet (or ambient air flow channel) 300. Funnels 290, 292 and 294 each include a first arm 296 and a second arm 298 extending from the respective pad 250, 252 and 254. In the embodiment shown in FIG. 2, the upper surfaces of arms 296 and 298 are recessed from bearing surface 202 by the step depth of 0.1 to 0.3 microns, for example. In alternative embodiments, arms 296 and 298 can be coplanar with bearing surface 202 or at other depths. Arms 296 and 298 extend relative to lateral center line 212 at a positive angle and a negative angle, respectively, which are greater than zero degrees and less than 90 degrees. In one embodiment, the angles are preferably greater than 15 degrees and less than 75 degrees and most preferably greater than 30 degrees and less than 60 degrees. For example, arms 296 and 298 can extend at positive and negative angles, respectively, of about 55 degrees relative to lateral center line 212. In one embodiment, the lengths of arms 296 and 298 are approximately equal to the lengths of their respective channels 264, 274 and 276. However, those skilled in the art will realize the length of the arms may have different ratios to the length of their respective channels and that the lengths of arms 296 and 298 do not have to be equal. In one embodiment, arms 296 and 298 are approximately 100 microns.

During operation, arms 296 and 298 re-direct or funnel air flow within subambient pressure cavity 240 into channels 264, 274 and 276. This further pressurizes the bearing surfaces that trail the channels, which further increases the local lift forces developed on these bearing surfaces. In addition, the air flow within cavity 240 expands in the areas 299 that are rearward of funnels 290, 292 and 294, which further increases local suction forces. Thus, the addition of funnels 290, 292 and 294 increases both lift and suction forces along trailing slider edge 206, which further increases stiffness. Funnels 290, 292 and 294 therefore provide more air for channels 264, 274 and 276 and deplete more air from cavity 240, downstream of the funnels.

Inlet channel 300 extends from leading slider edge 204 to the inlet of funnel 290 and convergent channel feature 264. Channel 300 has a channel floor 302 and channel side walls 304 and 306. Channel floor 302 communicates with leading slider edge 204 and has a depth which is substantially equal to the depth of cavity floor 242. However, channel floor 302 can have other depths that are greater than or equal to the depth of cavity floor 242. Channel side walls 304 and 306 extend from the trailing edge 218 of cavity dam 214 to the inlet of funnel 290 for isolating the ambient air within channel 300 from the subambient pressure developed in subambient pressure cavity 240. In one embodiment, the upper surfaces of channel side walls 304 and 306 are recessed from bearing surface 202 by the step depth. However, channel side walls 304 and 306 can be recessed by other depths than the step depth or can be coplanar with bearing surface 202 in alternative embodiments.

Channel 300 directs air flow at substantially ambient pressure from leading slider edge 204 to the inlet of funnel 290 and convergent channel feature 264. By directing substantially ambient pressure, as opposed to subambient pressure, to the inlet of convergent channel feature 264 channel 300 increases the pressure boundary conditions at the inlet of convergent channel feature 264. This results in even more air being provided to the convergent channel feature and a greater pressure gradient developed behind trailing channel end 282 of convergent channel feature 264.

The performance of slider 110 (shown in FIG. 2) was compared with the performance of slider 400 shown in FIG. 3, which includes a leading slider edge 402, a trailing slider edge 404 and slider side edges 406 and 408. Slider 400 further includes a leading taper 410, a cavity dam 412, border walls 414 and 416, subambient pressure cavity 418, center pad 420 and side pads 422 and 424. Pads 420, 422 and 424 include convergent channel features 426, 428 and 430, respectively. Channels 426, 428 and 430 each have a channel floor 432 which is recessed from and substantially parallel to bearing surfaces 434. Channel floors 432 are raised from the floor of subambient pressure cavity 418.

The fly attitude and stiffnesses of sliders 110 and 400 were simulated, and the results of the simulation is shown below in Table 1:

TABLE 1

|  | SLIDER 400 | SLIDER 110 |
| --- | --- | --- |
| PTFH (nm) | 11.8 | 12.3 |
| Pitch (urad) | 226 | 209 |
| Roll (urad) | 0.5 | 7 |
| Kz (gmf/nm) | 0.14 | 0.18 |

TABLE 1-continued

|  | SLIDER 400 | SLIDER 110 |
|---|---|---|
| Kp (uN.M/urad) | 0.44 | 0.52 |
| Kc (mg/nm) | 62 | 76 |

As shown in Table I, slider 110 is observed to yield larger pitch stiffness, "Kp", vertical stiffness, "Kz", and contact stiffness, "Kc", than slider 400. For example, slider 110 generates 76 mg/nm in contact stiffness Kc as compared to 62 mg/nm generated by slider 400. This in turn results in lower sensitivity of the pole tip fly height to manufacturing variations. Additionally, dynamic computer simulation showed that slider 110 outperformed slider 400 in terms of damping and take-off performance, due to its relatively larger pressurization at lower velocity. Larger pressurization at lower velocity enhances take-off performance. Slider 110 also generated higher pressure gradients, which increase damping.

The particular bearing geometry of the slider can have a variety of configurations in alternative embodiments of the present invention. The isolated bearing pads as shown in FIG. 2 are shown as an example only. FIG. 4 is a top plan view of a slider 450 having a different bearing configuration according to an alternative embodiment of the present invention. Slider 450 includes leading edge 452, trailing edge 454, slider side edges 456 and 458, cavity dam 460, subambient pressure cavity 462, side rails 464 and 466, and center rail 468. Side rails 464 and 466 each have a leading bearing surface 470, a trailing bearing surface 472 and a recessed step surface 474. Recessed step surface 474 is recessed from bearing surfaces 470 and 472 by the step depth of about 0.1 microns to about 0.3 microns, for example. Similarly, cavity dam 460 is recessed from bearing surfaces 470 and 472 by the step depth. Recessed step surfaces 474 and cavity dam 460 are generally parallel to bearing surfaces 470 and 472. Similarly, center rail 468 has a bearing surface 480 and leading and side step surfaces 482. Step surfaces 482 are parallel to and recessed from bearing surface 480 by the step depth. Subambient pressure cavity 462 is recessed from bearing surfaces 470, 472 and 480 by a cavity depth, which is greater than the step depth.

Convergent channel features 490, 492 and 494 are recessed within trailing bearing surfaces 472 and in bearing surface 480 of center rail 468. Channels 490 and 492 are open to fluid flow from recessed step surfaces 474, and channel 494 is open to fluid flow from recessed step surface 482 and cavity 462. A leading edge inlet channel 496 extends from leading slider edge 452, through cavity dam 460 and cavity 464 to a location just upstream of the inlet to convergent channel feature 494. Channel 496 is formed by walls 498 and 499, which are recessed from bearing surfaces 470 and 470 by the step depth, for example. Channel 496 feeds substantially ambient pressure to convergent channel feature 494. Additional leading edge inlet channels (not shown) can be formed in slider 450 for feeding substantially ambient pressure to convergent channel features 490 and 492 in alternative embodiments. These channels could extend longitudinally through or along rails 464 and 466, from leading slider edge 452 to the inlets of channels 490 and 492.

FIG. 5-1 is a top plan view of a slider 500 according to another alternative embodiment of the present invention in which the leading edge inlet channel and the convergent channel are connected and combined with one another.

Slider 500 has a leading slider edge 502, a trailing slider edge 504 and side edges 506 and 508. A cavity dam 510 extends across the width of slider 500, along leading slider edge 502. The upper surface of cavity dam 510 defines a bearing surface for slider 500. A stepped leading taper 512 extends along the leading edge of cavity dam 510. Stepped leading taper 512 is substantially parallel to the upper surface of cavity dam 510 and is recessed from the cavity dam by the step depth, for example. A pair of border walls or rails 514 and 516 extend rearward from cavity dam 510 along side edges 506 and 508, respectively. Border walls 514 and 516 terminate prior to trailing slider edge 504. In one embodiment, border walls 514 and 516 are recessed from the bearing surface defined by cavity dam 510 by the step depth. In alternative embodiments, border walls 514 and 516 are not recessed and form respective bearing surfaces. Cavity dam 510 and border walls 514 and 516 define subambient pressure cavities 518 and 520, which are divided by center rail 522.

Center rail 522 extends from trailing slider edge 504 to the trailing edge of cavity dam 510. Center rail 522 has a trailing bearing surface 524, recessed step surfaces 526 and a leading edge inlet/convergent channel feature 532, which extends from bearing surface 524 to leading edge 502. Channel 532 includes a leading channel end 534, a trailing channel end 536, channel side walls 538 and 540, and a channel floor 542. In this embodiment, the channel side walls of the leading edge inlet channel are coupled to and contiguous with the channel side walls of the convergent channel feature such that the overall channel 532 is isolated from subambient pressure cavities 518 and 520. Channel floor 542 is recessed from bearing surface 524 and the upper surface of cavity dam 510 by a depth substantially equal to the depth of subambient pressure cavities 518 and 520. However, other depths can also be used which are constant and can vary from leading channel end 534 and trailing channel end 536. Recessed step surface 526 and channel side walls 538 and 540 are recessed from bearing surface 524 by the step depth, for example. Leading channel end 534 is open to substantially fluid flow at substantially ambient pressure from leading slider edge 502, and trailing channel end 536 is closed to the fluid flow.

During operation, the leading walls to either side of leading channel end 534 present themselves as a substantial pressure rise to the local fluid flow. Since the opening to channel 532 does not have the same pressure rise, it is seen as a preferential path for the fluid flow to travel. Once the fluid flow enters channel 532, the flow is essentially bounded by channel side walls 538 and 540 and is forced to rise over trailing channel end 536, forming a "convergent" channel for the flow. This creates a localized pressure gradient on bearing surface 524, just rearward of trailing channel end 536. In a typical air bearing slider, the air bearing rails and leading edge steps often divert the airflow around the trailing edge pads on the slider. In contrast, channel 532 on slider 500 allows air to pass from leading slider edge 502 to trailing bearing surface 524 without any obstructions. This greatly increases the amount of flow over trailing bearing surface 524, thus increasing pressure.

FIG. 5-2 is a three dimensional graph illustrating a simulated pressure profile developed along slider 500. Axis 550 represents distance along the longitudinal axis of slider 500, and axis 552 represents distance along the transverse axis of slider 500. Axis 554 represents pressure in hundredths of atmospheres. Slider 500 develops a relatively high peak pressure 556 of 15.8 atmospheres along trailing bearing surface 524.

The performance of slider 500 was compared with the performance of a similar slider 600 (shown in FIG. 6-1) having no convergent channel feature open to the leading edge of the slider. Slider 600 has a cavity dam 602, a leading step surface 604, border walls or rails 606 and 608, and a trailing pad 610. Trailing pad 610 has a bearing surface 612 and recessed leading and side step surfaces 614.

FIG. 6-2 is a three dimensional graph showing a simulated pressure profile developed by slider 600. Again, axis 620 represents distance along the longitudinal axis of slider 600, axis 622 represents distance along the transverse axis of slider 600, and axis 624 represents pressure in hundredths of atmospheres. Slider 600 develops a peak pressure 626 of only 10.8 atmospheres, as compared to 15.8 atmospheres developed by slider 500.

FIG. 6-3 is a graph illustrating the simulated pressure profiles of sliders 500 and 600 along the lateral center line of each slider, from the leading slider edge to the trailing slider edge. Axis 630 represents distance along each slider's length, and axis 632 represents pressure in hundredths of atmospheres. Line 634 represents the pressure profile of slider 500, and line 636 presents the pressure profile of slider 600. Slider 600 clearly develops a greater pressure peak and a greater pressure gradient near the trailing edge of the slider as compared to slider 600.

FIG. 7 is a top plan view of a slider 700 according to yet another alternative embodiment of the present invention. Slider 700 includes side rails 702 and 704, center rail 706, cavity dam 708 and subambient pressure cavities 710 and 712. Side rails 702 and 704 extend from the leading slider edge toward the trailing slider edge and include a leading bearing pad 720, a recessed trailing pad 722 and a recessed waist section 724. Recessed trailing pad 722 and recessed waist section 724 are recessed from leading bearing pad 720 by the step depth, for example. A plurality of small convergent channel features 726 are formed on recessed trailing pad 722. Channels 726 have upper surfaces that are generally coplanar with bearing surfaces 720 and have inlets that are open to fluid flow from recessed trailing pad 722 and trailing channel ends that are closed to the fluid flow. Cavity dam 708 is recessed from leading bearing surfaces 720 by the step depth, for example.

Center rail 706 extends from cavity dam 708 to the trailing slider edge. Center rail 706 has a recessed trailing pad 730 and a plurality of convergent channel features 732, which are similar to channels 726. However, channels 732 are open to fluid flow from a larger combined leading edge inlet/convergent channel feature 734, which is recessed within center rail 706, forward of recessed trailing pad 730. Channel 734 has a leading channel end 736, a trailing channel end 738, channel side walls 740 and 742 and a channel floor 744. Channel floor 744 is at substantially the same depth as subambient pressure cavities 710 and 712. Leading channel end 736 is open to fluid flow from the leading slider edge, and trailing channel end 738 is closed to the fluid flow. In contrast to the embodiment shown in FIG. 5-1, channel side walls 740 and 742 diverge from one another as they extend from cavity dam 708 to recessed trailing pad 730.

FIG. 8 is a top plan view of a slider 800 according to another alternative embodiment of the present invention. Slider 800 includes side rails 802 and 804, center rail 806, cavity dam 808 and subambient pressure cavities 810 and 812. Side rails 802 and 804 extend from the leading slider edge toward the trailing slider edge and include a leading bearing pad 820, a recessed trailing pad 822 and a recessed waist section 824. Recessed trailing pad 822 and recessed waist section 824 are recessed from leading bearing pad 820 by the step depth, for example. A plurality of small convergent channel features 826 are formed on recessed trailing pad 822. Channels 826 have upper surfaces that are generally coplanar with bearing surfaces 820 and have inlets that are open to fluid flow from recessed trailing pad 822 and trailing channel ends that are closed to the fluid flow. Similarly, center rail 806 has a recessed trailing pad 830 and a plurality of small convergent channel features 832, which are similar to channels 826. However, channels 832 are open to fluid flow from a larger combined leading edge inlet/convergent channel feature 834, which is recessed within center rail 806, forward of recessed trailing pad 830. Channel 834 has a leading channel end 836, a trailing channel end 838, channel side walls 840 and 842 and a channel floor 844. Channel side walls 840 and 842 diverge from one another at a first angle relative to the lateral center line of the slider and then at a second, greater angle, as they extend from cavity dam 808 to recessed trailing pad 830.

A variety of other air bearing surface geometries can also be used. For example, the convergent channel features and leading edge inlets can be used with positive pressure air bearing (PPAB) sliders having no cavity dam. Also, these features can be positioned at various locations on the overall bearing surface for providing localized pressure gradients within the pressure profile between the slider and the disc surface. In one embodiment, the convergent channel features are located rearward of at least a portion of the subambient pressure cavity. For example, the channels can be located rearward of a midpoint along the length of the slider, as measured from the leading slider edge to the trailing slider edge.

In summary, one embodiment of the present invention is directed to a disc head slider 110, 450, 500, 700, 800 which includes a slider body having a disc-opposing face 200 with leading and trailing slider edges 204 and 206, 452 and 454, 502 and 504, a slider length measured between the leading and trailing slider edges, a bearing surface 202, 214, 262, 270, 272, 510, 524, 720, 726, 732, 820, 826, 832, a recessed area 240, 462, 518, 520, 710, 712, 810, 812, an inlet 300, 496, 532, 734, 834 and a convergent channel 264, 494, 532, 734, 834. The recessed area 240, 462, 518, 520, 710, 712, 810, 812 is recessed from the bearing surface 202, 214, 262, 270, 272, 510, 524, 720, 726, 732, 820, 826, 832. The inlet 300, 496, 532, 734, 834 has a leading channel end, which is open to air flow from the leading slider edge 204, 452 and 502, channel side walls 304, 306, 498, 499, 538, 540 and a trailing channel end. The convergent channel 264, 494, 532, 734, 834 has a leading channel end 280, 534, 736, 836, which is open to fluid flow from the inlet, channel side walls 284, 538, 540, 740, 742, 840, 842, and a trailing channel end 282, 536, 738, 838, which is closed to the fluid flow. The trailing channel end 282, 536, 738, 838 of the convergent channel is located along the slider length rearward of at least a portion of the recessed area 240, 462, 518, 520, 710, 712, 810, 812 and forward of at least a portion of the bearing surface 262, 480, 524, 732, 832.

Another embodiment of the present invention is directed to a disc head slider 110, 450, 500, 700, 800 which includes a disc-opposing face 200 having a bearing surface 202, 214, 262, 270, 272, 510, 524, 720, 726, 732, 820, 826, 832. A convergent channel 264, 494, 532, 734, 834 is recessed within the disc-opposing face for receiving substantially ambient air flow from a leading edge 204, 452 and 502 of the disc-opposing face 200 and generating a positive pressure gradient along the bearing surface, near a trailing edge 206, 454, 504 of the disc-opposing face 200.

Another embodiment of the present invention is directed to a disc drive assembly 100 which includes a disc 107 rotatable about a central axis 109 and a slider 110, 450, 500, 700, 800 supported over the disc 107. The slider 110, 450, 500, 700, 800 includes a slider body having a disc-opposing face 200 with leading and trailing slider edges 204 and 206, 452 and 454, 502 and 504, a slider length measured between the leading and trailing slider edges, a bearing surface 202, 214, 262, 270, 272, 510, 524, 720, 726, 732, 820, 826, 832, a recessed area 240, 462, 518, 520, 710, 712, 810, 812, an inlet 300, 496, 532, 734, 834 and a convergent channel 264, 494, 532, 734, 834. The recessed area 240, 462, 518, 520, 710, 712, 810, 812 is recessed from the bearing surface 202, 214, 262, 270, 272, 510, 524, 720, 726, 732, 820, 826, 832. The inlet 300, 496, 532, 734, 834 has a leading channel end, which is open to air flow from the leading slider edge 204, 452 and 502, channel side walls 304, 306, 498, 499, 538, 540 and a trailing channel end. The convergent channel 264, 494, 532, 734, 834 has a leading channel end 280, 534, 736, 836, which is open to fluid flow from the inlet, channel side walls 284, 538, 540, 740, 742, 840, 842, and a trailing channel end 282, 536, 738, 838, which is closed to the fluid flow. The trailing channel end 282, 536, 738, 838 of the convergent channel is located along the slider length rearward of at least a portion of the recessed area 240, 462, 518, 520, 710, 712, 810, 812 and forward of at least a portion of the bearing surface 262, 480, 524, 732, 832.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the slider while maintaining substantially the same functionality without departing from the scope and spirit of the present invention. In addition, although the preferred embodiment described herein is directed to a slider for a hard disc drive system, it will be appreciated by those skilled in the art that the teachings of the present invention can be applied to other systems, like floppy disc drives or other storage systems, without departing from the scope and spirit of the present invention.

What is claimed is:

1. A disc head slider comprising:
    a slider body having a disc-opposing face with leading and trailing slider edges, a slider length measured between the leading and trailing slider edges, and a bearing surface;
    a recessed area formed within the disc-opposing face, which is recessed from the bearing surface;
    an inlet formed within the disc-opposing face and comprising a leading channel end, which is open to air flow from the leading slider edge, channel side walls and a trailing channel end; and
    a convergent channel formed within the disc-opposing face and comprising a leading channel end, which is open to fluid flow from the inlet, channel side walls and a trailing channel end, which is closed to the fluid flow, wherein the trailing channel end of the convergent channel is located along the length rearward of at least a portion of the recessed area and forward of at least a portion of the bearing surface.

2. The disc head slider of claim 1 wherein the inlet further comprises a channel floor which is substantially coplanar and contiguous with the recessed area.

3. The disc head slider of claim 1 wherein the channel floor of the inlet has a depth relative to the bearing surface that is less than a depth of the recessed area relative to the bearing surface.

4. The disc head slider of claim 1 wherein the channel side walls of the inlet are recessed from the bearing surface and raised from the recessed area.

5. The disc head slider of claim 1 wherein the channel side walls of the inlet are contiguous with the channel side walls of the convergent channel such that the inlet and the convergent channel are isolated from the recessed area wherein said isolation is, from the leading channel end of the inlet to the trailing channel end of the convergent channel.

6. The disc head slider of claim 1 wherein the channel side walls of the inlet and the convergent channel are parallel to one another along their entire lengths, as measured in a direction from the leading slider edge toward the trailing slider edge.

7. The disc head slider of claim 1 wherein the channel side walls of at least one of the inlet and the convergent channel diverge from one another along at least a portion of their lengths, as measured in a direction from the leading slider edge toward the trailing slider edge.

8. The disc head slider of claim 1 and further comprising:
    a cavity dam; and
    a subambient pressure cavity positioned rearward of the cavity dam and at least partially forward of the convergent channel, wherein the sumabient pressure cavity defines the recessed area and the inlet extends through the cavity dam and at least a portion of the subambient pressure cavity.

9. The disc head slider of claim 8 wherein the airflow channel terminates within the subambient pressure cavity, prior to the leading channel end of the convergent channel such that the leading channel end of the convergent channel is open to air flow from the inlet and the subambient pressure cavity.

10. The disc head slider of claim 9 and further comprising:
    a funnel comprising first and second funnel walls which are positioned to funnel air flow from the subambient pressure cavity into the leading channel end of the convergent channel.

11. The disc head slider of claim 10 wherein the funnel walls are recessed from the bearing surface and raised from the recessed area.

12. The disc head slider of claim 8 and further comprising:
    a bearing pad positioned generally along the trailing slider edge and having an upper surface which at least partially defines the bearing surface, wherein the convergent channel is recessed within the bearing pad.

13. The disc head slider of claim 12 wherein the channel side walls of the inlet extend from the cavity dam to the bearing pad, through the subambient pressure cavity.

14. The disc head slider of claim 1 and further comprising:
    first and second rails extending generally between the leading and trailing slider edges, disposed about the recessed area and having an upper surface which at least partially defines the bearing surface.

15. A disc head slider comprising:
    a disc-opposing face having a bearing surface and a recessed area, which is recessed from the bearing surface; and
    convergent channel means recessed within the disc-opposing face for receiving substantially ambient air flow from a leading edge of the disc-opposing fare and generating a positive pressure gradient along the bearing surface, near a trailing edge of the disc-opposing face, wherein the convergent channel means comprises: an inlet having a leading channel end, which is open to air flow from the leading edge, channel side walls and a trailing channel end; and a convergent channel comprising a leading channel end, which is open to fluid flow from the inlet, channel side walls and a trailing channel end, which is closed to the fluid flow, wherein the trailing channel end of the convergent channel is located along the length rearward of at least a portion of the recessed area and forward of at least a portion of the bearing surface.

16. The disc head slider of claim 15 wherein:

the inlet further comprises a channel floor which is substantially coplanar and contiguous with the recessed area; and the channel side walls of the inlet are recessed from the bearing surface and raised from the recessed area.

17. The disc head slider of claim 15 and further comprising:

a cavity dam; and a subambient pressure cavity positioned rearward of the cavity dam and at least partially forward of the convergent channel, wherein the sumabient pressure cavity defines the recessed area and the inlet extends through the cavity dam and at least a portion of the subambient pressure cavity.

18. The disc head slider of claim 17 wherein the airflow channel terminates within the subambient pressure cavity, prior to the leading channel end of the convergent channel such that the leading channel end of the convergent channel is open to air flow from the inlet and the subambient pressure cavity.

19. The disc head slider of claim 18 and further comprising:

a funnel comprising first and second funnel walls which are positioned to funnel air flow from the subambient pressure cavity into the leading channel end of the convergent channel.

20. The disc head slider of claim 17 wherein the channel side walls of the inlet are contiguous with the channel side walls of the convergent channel such that the inlet and the convergent channel are isolated from the subambient pressure cavity, from the leading channel end of the inlet to the trailing channel end of the convergent channel.

21. The disc head slider of claim 17 and further comprising:

a bearing pad positioned generally along the trailing slider edge and having an upper surface which at least partially defines the bearing surface, wherein the convergent channel is recessed within the bearing pad.

22. A disc drive assembly comprising:

a disc rotatable about a central axis; and a slider supported over the disc and comprising:

a slider body having a disc-opposing face with leading and trailing slider edges, a slider length measured between the leading and trailing slider edges, and a bearing surface;

a recessed area formed within the disc-opposing face, which is recessed from the bearing surface;

an inlet formed within the disc-opposing face and comprising a leading channel end, which is open to air flow from the leading slider edge, channel side walls and a trailing channel end; and a convergent channel formed within the disc-opposing face and comprising a leading channel end, which is open to fluid flow from the inlet, channel side walls and a trailing channel end, which is closed to the fluid flow, wherein the trailing channel end of the convergent channel is located along the length rearward of at least a portion of the recessed area and forward of at least a portion of the bearing surface.

* * * * *

UNITED STATES PATENT AND TRADEMARK OFFICE
CERTIFICATE OF CORRECTION

PATENT NO. : 6,560,071 B2
DATED : May 6, 2003
INVENTOR(S) : Chapin et al.

It is certified that error appears in the above-identified patent and that said Letters Patent is hereby corrected as shown below:

<u>Title page,</u>
Item [75], Inventors, add inventor, -- Ram M. Rao, Shoreview, MN (India) --.

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,560,071 B2
DATED : May 6, 2003
INVENTOR(S) : Chapin et al.

It is certified that error appears in the above-identified patent and that said Letters Patent is hereby corrected as shown below:

<u>Title page,</u>
Item [75], Inventors, add inventor, -- Ram M. Rao, Shoreview, MN (US) --.

This certificate supersedes Certificate of Correction issued July 26, 2005.

Signed and Sealed this

Eleventh Day of April, 2006

JON W. DUDAS
*Director of the United States Patent and Trademark Office*